United States Patent
Fitch et al.

[11] Patent Number: 5,322,972
[45] Date of Patent: Jun. 21, 1994

[54] HARNESS AND CABLE BRANCH-OFF

[75] Inventors: Anthony R. L. Fitch; Alan Barrat; Graham Miles, all of Swindon, England

[73] Assignee: Raychem Limited, United Kingdom

[21] Appl. No.: 955,701

[22] PCT Filed: Jun. 20, 1991

[86] PCT No.: PCT/GB91/00991
  § 371 Date: Dec. 16, 1992
  § 102(e) Date: Dec. 16, 1992

[87] PCT Pub. No.: WO92/00621
  PCT Pub. Date: Jan. 9, 1992

[30] Foreign Application Priority Data
  Jun. 22, 1990 [GB] United Kingdom ............... 9013985
  Feb. 6, 1991 [GB] United Kingdom ............... 9102597

[51] Int. Cl.$^5$ .............................................. H02G 15/08
[52] U.S. Cl. .................................. 174/88 R; 174/77 R; 174/84 R; 174/DIG. 8
[58] Field of Search ............ 174/DIG. 8, 88 R, 84 R, 174/77 R; 24/136 L, 503, 505, 507, 537, 536, 563; 156/86; 403/273; 428/34.9

[56] References Cited

U.S. PATENT DOCUMENTS

| | | | |
|---|---|---|---|
| 474,719 | 5/1892 | Brande | 24/503 |
| 1,801,128 | 4/1931 | Waller | 24/507 X |
| 3,753,213 | 8/1973 | Frey | 174/88 R X |
| 4,246,687 | 1/1981 | Nolf | 29/447 |
| 4,283,239 | 8/1981 | Corke et al. | 174/84 R X |
| 4,420,654 | 12/1983 | Muller | 174/92 |
| 4,734,543 | 3/1988 | Nolf | 174/88 R |
| 4,860,799 | 8/1989 | Van Noten | 174/DIG. 8 |

FOREIGN PATENT DOCUMENTS

| | | |
|---|---|---|
| 615071 | 6/1935 | Fed. Rep. of Germany . |
| 3614426 | 11/1987 | Fed. Rep. of Germany . |
| 3815027 | 11/1989 | Fed. Rep. of Germany . |
| 463125 | 6/1935 | United Kingdom ............... 24/507 |
| 1155470 | 6/1969 | United Kingdom . |
| 2095926 | 10/1982 | United Kingdom . |
| 2214361 | 8/1989 | United Kingdom . |

*Primary Examiner*—Morris H. Nimmo
*Attorney, Agent, or Firm*—Sheri M. Novack; Herbert G. Burkard

[57] ABSTRACT

An arrangement for enclosing a branch-off between two or more cables (11,12) comprises a dimensionally recoverable sleeve (1) which can surround the branch-off and a clip (6) having a pair of legs (8) that can be positioned about opposed walls of the sleeve to divide the sleeve into channels for the cables. The sleeve has one or more transversely extending ribs at its end and the clip has a profile, e.g. being provided with protuberances 9, such that it can be pushed onto the end of the sleeve and can be retained thereon by engagement of the rib(s).

16 Claims, 2 Drawing Sheets

HARNESS AND CABLE BRANCH-OFF

This invention relates to dimensionally recoverable articles and especially to the use of such articles for the insulation and/or protection of elongate objects such as cable harnesses.

Dimensionally recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In there most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example U.S. Pat. No. 2,027,962, the original dimensionally heat-stable form may be a transient form in a continuous process in which, for example, an extruded tube is expanded, whilst hot, to a dimensionally heat-unstable form but, in other applications, a performed dimensionally heat stable article is deformed to a dimensionally heat unstable form in a separate stage.

In other articles, as described, for example, in British Patent 1,440,524, and elastomeric member such as an outer tubular member is held in a stretched state by a second member, such as an inner tubular member, which, upon heating, weakens and thus allows the elastomeric member to recover.

In certain circumstances it is necessary to enclose a branch in an electrical cable, in which case a clip may be employed to bifurcate the dimensionally recoverable article into two (or more) outlets for the cable, a number of such clips being described in UK patent specification No. 1,604,981. However, one problem that has been encountered with the use of clips in such arrangements is that, as the sleeve recovers, the clip can attempt to slide off the end of the sleeve due to the recovery forces in the sleeve, this phenomenon being referred to in the art as "milking off". Although a number of means have been provided according to the prior art for preventing the clip milking off in this way, they have been employed in arrangements designed for use with telecommunication cables and are not applicable for use with smaller cables and branch-offs, such as employed in electrical wiring harnesses, especially those intended for use in a high temperature sealed for environment, e.g. for military use. In contrast with branch-offs employed for telecommunications, these branch-offs are often subjected to prolonged periods in use during which the temperature rises above the recovery temperature of the sleeve so that the clip is therefore again subjected to the "milking off" forces, sometimes on a continual basis, and often in the presence of vibration.

According to one aspect, the present invention provides an arrangement for enclosing a branch-off between a pair of elongate bodies, which comprises a dimensionally recoverable sleeve which can surround the branch-off, and a clip having a pair of legs that can be positioned about opposed walls of the sleeve to divide the sleeve into channels for the bodies, the sleeve having a transversely extending rib in the region of an end thereof and the clip having a profile such that it can be pushed onto the end of the sleeve and be retained on the sleeve by engagement of the rib.

The clip may have any of a number of configurations. For example, in one type of clip in which it is of unitary form the legs are separated from one another along their length by spacing that increases in the region of the clip where the legs are joined together in order to accommodate the rib. For example, the spacing between the legs of the clip may have a substantially keyhole profile which has an enlarged circular region for accommodating the rib. The clip may be formed from wire or otherwise have a configuration in which the legs are of generally constant thickness, or it may be formed from sheet metal in which case the width of the legs (in a direction perpendicular to their spacing) preferably increases in the direction toward the region where they are joined.

In another configuration the clip may be provided with one or more protuberances, and so, according to another aspect, the present invention provides an arrangement for enclosing a branch-off between a pair of elongate bodies, which comprises a dimensionally recoverable sleeve which can surround the branch-off, and a clip having a pair of legs that can be positioned about opposed walls of the sleeve to divide the sleeve into channels for the bodies, at least one leg of the clip having one or more protrusions, and the sleeve having at least one transversely extending rib on its external surface in the region of an end thereof which is engaged by the protrusion(s) of the clip on the sleeve curing recovery of the sleeve.

Preferably the clip has one or more protrusions on each leg, and especially has more than one, e.g. two protrusions on each leg. Preferably also the or each protrusion is asymmetrical in shape in the longitudinal direction, i.e. when viewed from the side of the clip, so that it will resist the clip slipping off the sleeve to a greater extent than it resists the clip being pushed on the sleeve. This may be achieved, at least in the broadest aspect of the invention, by providing the clip with legs having inwardly directed edges or surfaces that have substantially saw tooth profiles.

The arrangement according the invention has the advantage that it provides a very simple and effective way of preventing the clip sliding or "milking" off the dimensionally recoverable article when the article is recovered about the branch-off and during its lifetime as mentioned above. The arrangement according to the invention is particularly suited to enclosing branch-offs in electrical wiring harnesses, especially those employed in the military market where a moulded recoverable article will normally be employed to enclose the branch-off.

The clip is preferably in a generally sheet-like form, each leg having a major surface that faces the other leg, and most preferably has been formed by stamping a shape out of sheet material and folding it into the appropriate shape. This form of clip may easily be pushed onto the edge of the recoverable sleeve due to the splayed out configuration of the legs, and then pressed by means of a pair of pliers or other tool, to force the legs together about the sleeve walls. This general form of clip is described in our copending published International Application No. WO 92/00623. The clip legs will normally be splayed outwardly by an angle of at least 10° and especially at least 20°, but preferably by not more than 50° and especially not more than 40°, the angle typically being about 30°. The clip is preferably
} formed from a metal, e.g. copper or stainless steel, and will usually have a thickness in the range of from 0.01 to 0.1 times the length of the legs, or typically from 0.4 to 0.8 mm. Such a thickness will normally allow the legs of the clip easily to be forced together by means of a hand-held tool but will give the clip sufficient rigidity in its central region where the legs join to prevent the legs being opened out under the recovery forces of the sleeve.

The clip will normally have a substantially "U" or "V" shaped configuration so that each leg is positioned outside the sleeve walls, although it is quite possible for the clip to have more legs if desired. For example, it could be formed with three legs in a substantially "E" shaped configuration so that the central leg is inserted between the sleeve walls, the central leg being employed, for example, to carry additional adhesive and/or to provide a high conductivity heat-transfer path to the interior of the sleeve.

It is preferred for the lateral dimensions of the clip (at least when fully installed and at least at the region thereof joining the legs) to be greater in the plane of the elongate bodies (herein referred to as the width of the clip) than in the direction normal to this plan (herein referred to as the height of the clip). The use of a relatively wide clip in sheet form has the advantage that the part of the clip at the end of the sleeve acts as a dam and prevents fused adhesive flowing directly out of the end of the sleeve. As the sleeve recovers, fused adhesive is forced laterally towards the elongate bodies and fills the small spaces extending along the elongate bodies which are created between each elongate body and the two opposed walls of the sleeve as the sleeve becomes taught. If these spaces are not filled they can provide leak paths for the ingress of moisture. In addition, a relatively wide clip can act as a spacer to maintain the sleeve in its correct configuration during sustained exposure to temperatures above the recovery temperature of the sleeve.

The clip preferably has legs whose width decreases in a direction away from the central region of the clip. Where such a clip configuration is adopted, the outlet channels formed for the cables will normally be oriented to diverge from one another rather than parallel to one another, which corresponds more closely with the orientation provided by existing moulded parts employed for harness branch-offs. The lateral edges of each clip leg may be curved or straight, but will often be substantially straight over at least a major part of their length, in which case the straight parts preferably subtend an angle in the range of at least 5° and especially at least 10° to each other, but preferably not more than 40° and especially not more than 30° to each other, the angle determining to some extent the angle at which the cables leave the branch-off. In some instances it may be preferable for the cables to be parallel, in which case a clip having parallel lateral edges is preferred.

In this form of clip the protrusions may conveniently be formed as flaps in the legs. For example, one or more rigid flaps may be stamped in the legs so that the free ends of the flaps are oriented toward the central region of the clip. Alternatively, the protrusions may be formed by punching the protrusions by means of an appropriately shaped die. In yet another form of arrangement the clip may be crimped so that each leg has a serrated or saw-tooth profile. If desired the protrusion may have the same spacing along the length of the clip legs as the spacing of the ribs on the recoverable article so that each tooth will engage a rib, or they may have spacings that are a multiple of the rib spacings so that only alternate or every third rib or so is gripped. In yet another arrangement the protrusions may have an intermediate spacing, eg. a spacing between the rib spacing and twice the rib spacing, or may have a spacing smaller than the rib spacing, and/or may have protrusions that are offset from those on the other leg, so that at least one protrusion will engage a rib even when the clip is pushed over the end of the sleeve by different extents.

The dimensionally recoverable article will usually be provided with a layer of adhesive or sealant on its internal surface for preventing moisture ingress. Adhesives or sealants that maybe employed include, hot-melt adhesives, e.g. those based on ethylene homo or copolymers, e.g. ethylene vinyl acetate or ethylene ethyl, acrylate, and polyamide adhesives, for example formed from polyamides having a relatively large number (e.g. >15) of carbon atoms between adjacent carbonyl groups, preferred polyamides being based on dimer diamines as described in U.S. Pat. Nos. 4,018,733 and 4,181,775.

The arrangement according to the invention is particularly appropriate for use with recoverable sleeves that are to be sealed from moisture ingress by means of an adhesive that is cured when or after the sleeve is recovered, for example, a two part epoxy adhesive that may be mixed and applied to the sleeve just before recovery. It is particularly advantageous for the curable adhesive to be pre-coated on the sleeve, in which case it is preferably in particulate form so that the reactive components exist separately from one another in the form of particles until recovery of the sleeve. Particulate adhesives that may be employed are described in British patent application No. 2,104,800 A and in European patent application No. 157,478, the disclosures of which are incorporated herein by reference.

The branch-off may need to be screened against electromagnetic interference, in which case an electrically conductive shield can be provided inside the recoverable article or a shield can be placed about the branch-off and connected to shielding on the cables or wiring before recovery of the article. Thus, for example, a braid or a recoverable screening fabric as described in European Application Nos. 153,823 or 175,544, may be placed about the branch-off and connected to exposed lengths of shielding on the cables or wiring by means of an electrically conductive adhesive containing metal flake or solder or by other means such as clips, wire whipping etc., and the dimensionally recoverable article may then be positioned over the screened branch-off. The walls of the braid can be brought together at one end of the braid and secured together between a pair of cables by means of an additional mechanical retainer, or they may simply be forced together by means of the clip.

The sleeve that is employed in the arrangement according to the invention is novel per se and so, according to another aspect, the invention provides a dimensionally recoverable sleeve for enclosing a branch-off between a pair of elongate bodies, the sleeve having one or more transversely extending ribs on its external surface in the region of an end thereof for preventing a clip to be positioned on it slipping off the sleeve during recovery thereof.

Preferably the sleeve has a plurality of transversely extending ribs, the or each rib preferably extending around the entire circumference of the sleeve so that the sleeve does not require exact rotational orientation about the cable or harness. The ribs are preferably asymetrical in shape when viewed from the side of the sleeve so that, as with the clip protrusions, they will resist a clip slipping off the sleeve to a greater extent than they resist it being pushed on the sleeve. This is preferably achieved by moulding the ribs with a substantially saw-tooth profile as viewed from the side of the sleeve. In most instances the ribs will stand proud of the outer surface of the sleeve so that that end of the sleeve has a greater average thickness than the other parts thereof. Alternatively, the ribs may be substantially flush with the rest of the outer surface of the sleeve, or even lower, and be separated by depressed grooves in the sleeve.

The moulded part is normally formed with a configuration such that, in its pre-expanded or fully recovered form, it has one end of larger diameter than the other end, as described in our copending published International Application No. WO 92/00622 the disclosure of which is incorporated herein by reference. However, while the arrangement will normally be employed to enclose branch-offs in which a single cable exists from one end, it is possible for more than one cable to exit both ends of the sleeve, in which case a sleeve having a substantially cylindrical configuration as moulded and having ribs at both ends would be employed. In the normal form of moulded part in which one end is of larger diameter than the other end, either the end of larger diameter or that of smaller diameter may be provided with the rib(s). Articles in which the end of larger diameter is provided with the rib(s) are suitable for enclosing branch-off in an electrical cable or harness, while articles in which the end of smaller diameter is provided with the ribs can be used, as conventional moulded articles, for recovery onto an electrical connector, but will allow two or more separate cables to exit from the connector.

The sleeve may be manufactured in a hollow tubular form in which case it will need to be positioned over the ends of the harness or cable and slid along it until it is in position over the branch-off. For applications in which this is inconvenient it may be desirable to form the sleeve as a so-called "wraparound" article in which the article has a slit extending along its length to enable it to be located directly over the branch-off without access to the ends of the harness, and is provided with means for retaining the opposed edges of the sleeve formed by the slit together during and after recovery. This is preferably achieved by means of the rail-and-channel closure described in British patent No. 1,155,470, although other means may be employed, for example, pressure sensitive adhesive on one or both edges and/or an adhesive patch extending over the edge region.

In addition, the clip that is employed in the arrangement is novel per se at least in its preferred form, and accordingly the invention provides a clip which can be positioned about opposed walls of a sleeve to divide the sleeve into a number of channels, the clip being of unitary form and having a pair of legs that are splayed outwardly but which can be forced towards each other after the clip has been positioned on the sleeve walls to grip the walls, at least one of the legs, and preferably both legs, having one or more protrusions thereon for retaining the clip on the sleeve.

One form of arrangement and sleeve in accordance with the present invention will now be described by way of example with reference to the accompanying drawings in which.

Figure 1:
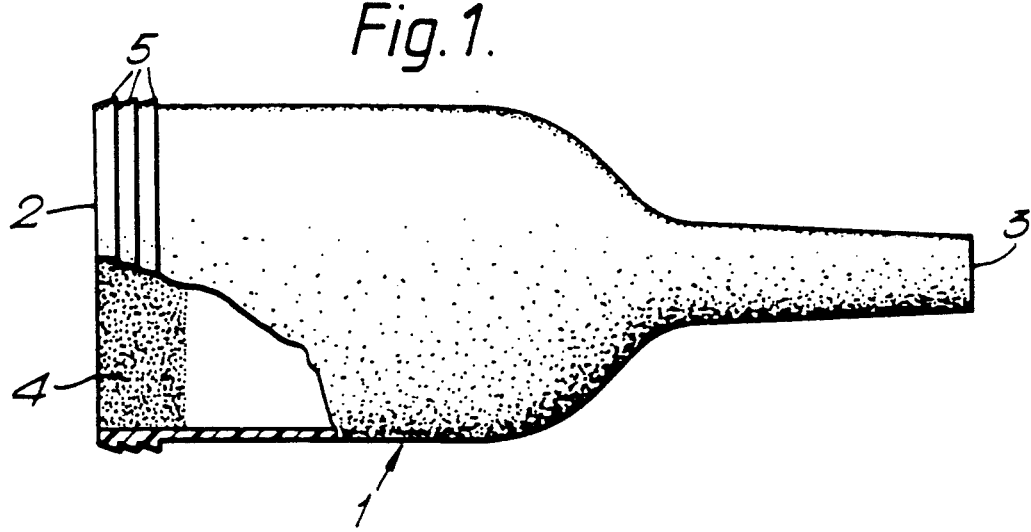
FIG. 1 is a partly cut-away drawing of a sleeve according to the invention in its unexpanded configuration.

Referring to the accompanying drawings, a moulded plastics sleeve 1 is shown in FIG. 1 in its configuration before expansion to render it heat-recoverable (or after complete recovery of the heat-shrinkable article). The sleeve has a hollow tubular body having one end 2 of relatively large diameter and another end 3 of smaller diameter, and is provided on its internal surface with a layer 4 of polyamide hot-melt adhesive or particulate epoxy/polyamide thermosetting adhesive at least in the region of the ends 2 and 3 for sealing against moisture ingress. In the region of end 2, the external surface of the sleeve is provided with three ribs 5 having a generally saw-tooth profile which extend around the entire circumference of the sleeve.

Figure 4:
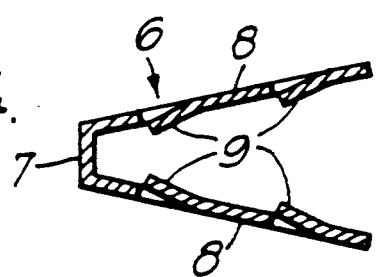
FIG. 4 is a sectional elevation taken along the length of the clip at its mid points.
Figure 5:
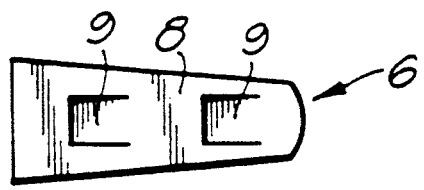
FIG. 5 is a plan view of the clip shown in FIG. 3.

FIGS. 4 and 5 show a clip 6 that may be employed with the sleeve of FIG. 1. The clip is formed from 0.635 mm thick stainless steel sheet and has been pressed into the configuration as shown in which it has a generally flat central region 7 and a pair of legs 8. Each leg 8 included a pair of rigid rectangular flaps 9 that have been stamped out of the sheet material and which extend inwardly between the legs to a small extent.

Figure 2:
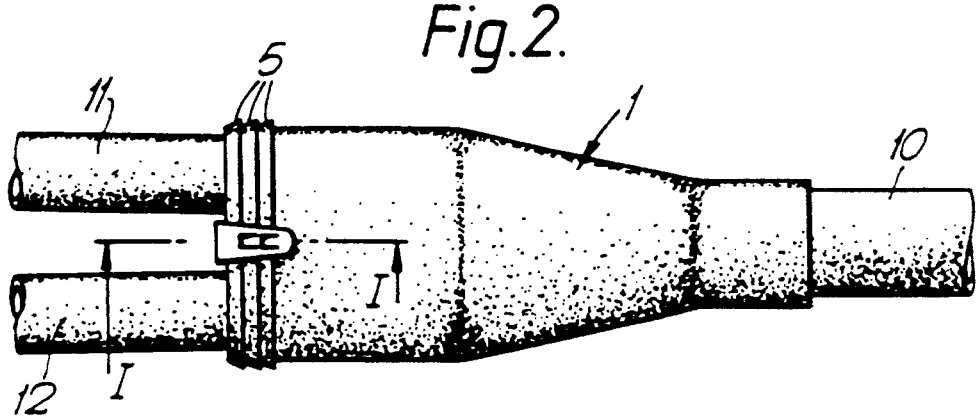
FIG. 2 shows the sleeve of FIG. 1 when recovered about a branch-off in a cable harness.

In operation, a branchout in an electrical harness may first be provided with electrical screening by means of a braid or other conductive fabric which is connected to the screens of the cables 10, 11 and 12. A moulded sleeve 1 in expanded form is then slipped over one end of the harness and moved along it until it is positioned over the branch-off region. The opposed walls of the sleeve 1 are then brought together in the region between cables 11, and 12, and a clip 6 in then pushed onto the sleeve walls. Once the clip is in position the clip legs are forced towards each other by means of a thin pair of pliars or other suitable hand-held gripping tool so that the clip grips the sleeve and the flaps 9 of the clip engage the ribs 5 of the sleeve. The arrangement can then simply be heated, for example, by means of a gas torch, hot-air gun or oven, to cause the sleeve to recover, thereby forming the completed branch-off as shown in FIG. 2.

Figure 6:
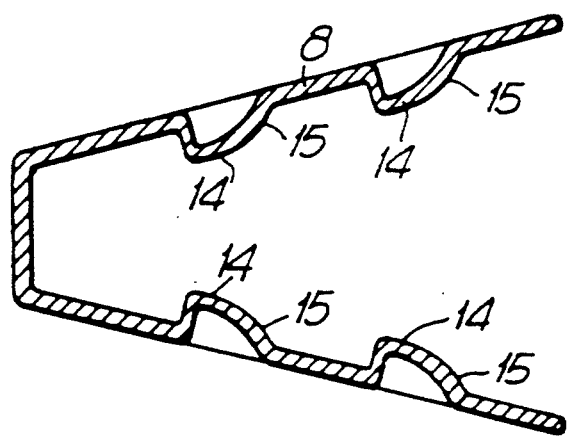
FIG. 6 is a section through part of an alternative form of clip.

During recovery of the sleeve, the adhesive 4 will melt and flow for a period of time before it begins to cure. This flow of adhesive 4 can cause adhesive to be forced through any small channels that would otherwise provide leak paths for moisture ingress. The relatively large width of clip will cause the central region 7 to prevent flow of the fused adhesive directly out of the end of the sleeve. Instead the adhesive is forced in a lateral direction by the recovery forces of the sleeve, and the adhesive fills the small channels of triangular cross-section which extend along the cables 2 to 4 and are caused by taughtening of the sleeve. As can be seen in FIG. 6, fillets of adhesives are formed in these regions indicating that the leak paths are completely sealed.

Figure 3:
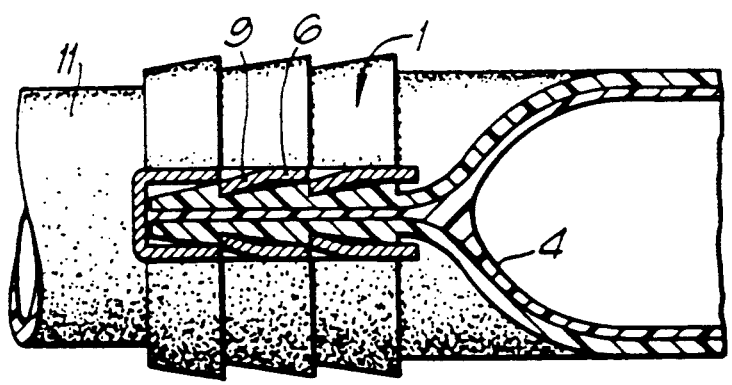
FIG. 3 is a sectional elevation taken along the line I—I of FIG. 2.

FIG. 6 is a section through an alternative form of clip which is generally of the form shown in FIGS. 3 and 4, but which has protrusions 14 in the inwardly facing surfaces of the legs 8 that are formed by stamping but which are not in the form of flaps. Because of the shape of die that is used to form the protrusions, they have a relatively shallow slope 15 directed towards the free ends of the legs and a relatively steep slope directed towards the central region of the clip.

Figure 7:
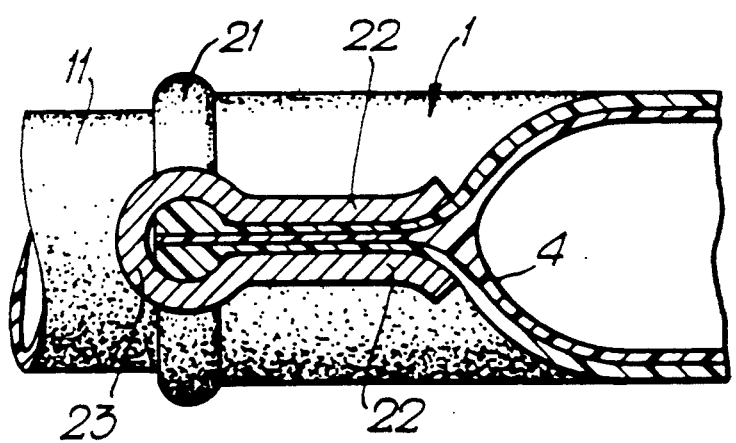
FIG. 7 is a sectional elevation similar to FIG. 3 of an alternative arrangement.

FIG. 7 shows an alternative form of clip and arrangement in which a branch-off in a harness to form a pair of separate cables (one cable 11 of which is shown) is enclosed in a dimensionally heat-recoverable moulded article 1. One end of the moulded article is divided into a pair of channels for accommodating the cables 11 by means of a clip 20 in the way generally as described with respect to FIG. 3.

In this arrangement, however, the moulded article is provided with a single rib 21 only located at its end, and the clip is formed from thick wire in a generally symetrical keyhole configuration in which the spacing between the keys 22 slightly decreases or is generally constant over the major part of their length but increases in the region 23 where they are joined. In the region 23 the clip has a generally circular configuration of relatively large diameter for accommodating the rib 21. The clip is formed from a resilient or "springy" material, eg spring steel so that the legs can be forced apart slightly when the clip is pushed onto the moulded article but will spring back when the clip is fully engaged by the rib 21.

Figure 8:
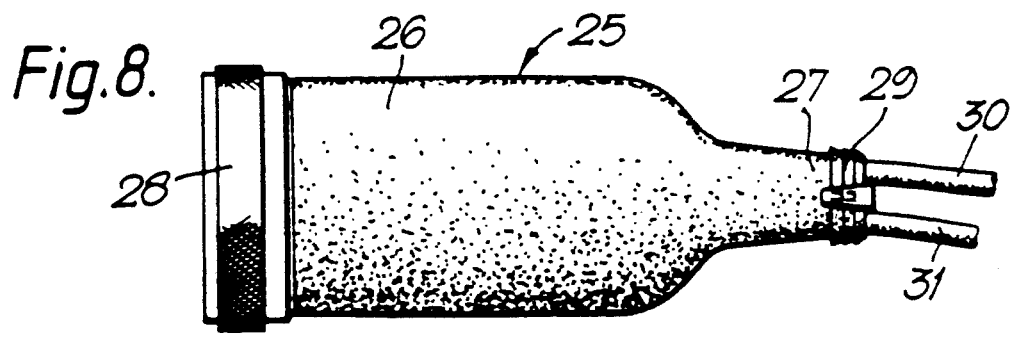
FIG. 8 is an elevation of a further form of invention.

FIG. 8 shows yet a further form of moulded article according to the invention. A heat-recoverable moulded article 25 is conventional in that it has one end 26 of larger diameter and another end 27 of smaller diameter (at least in its recovered state as shown) and is intended to be recovered about an electrical connector or a part thereof such as a spin-coupling adaptor 28 so that it will enclose the end region of an electrical cable to be terminated. In this embodiment, however, ribs 29 are provided on the end of the article of smaller diameter so that a pair of cables 30 and 31 can be terminated directly at the connector without the need for a separate branch-off.

We claim:

1. An arrangement for enclosing a branch-off between a pair of elongate bodies, which comprises a dimensionally recoverable sleeve which can surround the branch-off, and a clip having a pair of legs that can be positioned about opposed walls of the sleeve to divide the sleeve into channels for the bodies, the sleeve having a transversely extending rib in the region of an end thereof and the clip having a profile such that it can be pushed onto the end of the sleeve and be retained on the sleeve by engagement of the rib.

2. An arrangement as claimed in claim 1, wherein the clip is of unitary form and the legs are separated by a spacing that increases in the region of the clip where the legs are joined together in order to accommodate the rib.

3. An arrangement as claimed in claim 1, wherein the clip is resiliently deformable to allow it to be located onto the sleeve.

4. An arrangement as claimed in claim 1, which includes more than one clip so that three or more channels can be formed.

5. An arrangement for enclosing a branch-off between a pair of elongate bodies, which comprises a dimensionally recoverable sleeve which can surround the branch-off, and a clip having a pair of legs that can be positioned about opposed walls of the sleeve to divide the sleeve into channels for the bodies, at least one leg of the clip having one or more protrusions, and the sleeve having at least one transversely extending rib on its external surface in the region of an end thereof which is engaged by the protrusion(s) of the clip when it is positioned on the sleeve and will retain the clip on the sleeve.

6. An arrangement as claimed in claim 5, wherein each protrusion is asymetrical in shape in the longitudinal direction so that it will resist the clip slipping off the sleeve to a greater extent than it resists the clip being pushed on the sleeve.

7. An arrangement as claimed in claim 5, wherein the clip is generally sheet like in form, each leg having a major surface that faces the other leg.

8. An arrangement as claimed in claim 7, wherein each protrusion is in the form of a flap that has been formed in the leg.

9. An arrangement as claimed in claim 5, wherein the clip is deformable so that the legs can be forced towards each other when the clip has been positioned on the sleeve.

10. An arrangement as claimed in claim 5, wherein the clip has one or more protrusions on each leg.

11. An arrangement as claimed in claim 4, which includes more than one clip so that three or more channels can be formed.

12. A dimensionally recoverable sleeve for enclosing a branch-off between a pair of elongate bodies, the sleeve having one or more transversely extending ribs on its external surface in the region of an end thereof for preventing a clip to be positioned on it slipping off the sleeve during recovery thereof.

13. A sleeve as claimed in claim 12, wherein each rib extends around the entire circumference of the sleeve.

14. A sleeve as claimed in claim 12, wherein each rib has a substantially saw-tooth profile when viewed from the side of the sleeve.

15. A sleeve as claimed in claim 12, which has been formed by moulding.

16. A sleeve as claimed in claim 12, which has a plurality of transversely extending rib.

* * * * *